United States Patent
D'Aleo et al.

(10) Patent No.: US 10,547,061 B2
(45) Date of Patent: Jan. 28, 2020

(54) FUEL CELL STACK

(71) Applicant: PLUG POWER INC., Latham, NY (US)

(72) Inventors: James D'Aleo, Clifton Park, NY (US); Charles Russell Elder, Averill Park, NY (US)

(73) Assignee: PLUG POWER INC., Latham, NY (US)

( * ) Notice: Subject to any disclaimer, the term of this patent is extended or adjusted under 35 U.S.C. 154(b) by 360 days.

(21) Appl. No.: 15/388,517

(22) Filed: Dec. 22, 2016

(65) Prior Publication Data

US 2018/0183074 A1      Jun. 28, 2018

(51) Int. Cl.
*H01M 8/0213*     (2016.01)
*H01M 8/1018*     (2016.01)

(52) U.S. Cl.
CPC .. *H01M 8/0213* (2013.01); *H01M 2008/1095* (2013.01)

(58) Field of Classification Search
CPC . H01M 8/0213; H01M 8/0221; H01M 8/0228
See application file for complete search history.

(56) References Cited

U.S. PATENT DOCUMENTS

| 5,482,792 A | * | 1/1996 | Faita | C25B 9/10 |
| | | | | 429/437 |
| 2003/0152819 A1 | * | 8/2003 | Hatoh | H01M 8/0221 |
| | | | | 429/437 |
| 2006/0115703 A1 | * | 6/2006 | Kubota | H01M 8/0221 |
| | | | | 429/483 |
| 2007/0264556 A1 | * | 11/2007 | Andreas-Schott | ......... |
| | | | | H01M 8/0204 |
| | | | | 429/434 |

OTHER PUBLICATIONS

EnginnersEdge, https://web.archive.org/web/20150315013507/https://www.engineersedge.com/oring_general.htm , obtained Apr. 3, 2019; published Mar. 15, 2015 (Year: 2015).*

* cited by examiner

*Primary Examiner* — Jimmy Vo
(74) *Attorney, Agent, or Firm* — Heslin Rothenberg Farley & Mesiti P.C.; Victor A. Cardona, Esq.

(57) ABSTRACT

A fuel cell stack includes a structural endplate having an exterior surface. An insulator plate contacts an interior surface of the structural endplate located on an opposite surface of the endplate relative to the exterior surface. A collector plate contacts the insulator plate on an opposite side of the insulator plate relative to the structural endplate. A pocket plate is located on an interior side of the collector plate located on an opposite side of the insulator plate relative to the structural endplate. The collective plate is received in a pocket of an exterior side of the pocket plate. The exterior side is adjacent the collector plate and closer to the structural endplate than an opposite side of the pocket plate.

12 Claims, 8 Drawing Sheets

| Item | Name | Negative | Positive | +/- Tolerance |
|---|---|---|---|---|
| Gasket Compression with No Shims | | | | |
| 113 | Collector Thickness | | 1.00 | 0.04 |
| 105 | Collector Pocket in Graphite | 0.90 | | 0.01 |
| 108 | Gasket Pocket in Graphite | | 0.79 | 0.03 |
| Sum Neg | | 0.90 | | |
| Sum Pos | | | 1.79 | |
| Compressed Gasket Total (CLEARANCE) (112) | | 0.89 | | 0.08 |

ALLOWABLE COMPRESSED GASKET THICKNESS  0.89  0.14
FOR GASKET THK = 1.20 +/- 0.05
WITH 10%-40% COMPRESSION

FIG. 8

FUEL CELL STACK

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically. Such a series of connected multiple fuel cells is referred to as a fuel cell stack. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions. For the plates to be located in particular positions relative to each other shims are often used to ensure that particular portions of a particular plate are held in a desired position. Such shims are an added complication in manufacturing and are relatively expensive compared to a production cost of a stack relative to the benefit provided by such shims.

Thus, there is a need for improved fuel cell systems and improved methods of manufacturing fuel cells that efficiently connect and arrange component parts of a fuel cell to each other.

SUMMARY OF THE INVENTION

The present invention provides, in a first aspect, a fuel cell stack which includes a structural endplate having an exterior surface. An insulator plate contacts an interior surface of the structural endplate located on an opposite surface of the endplate relative to the exterior surface. A collector plate contacts the insulator plate on an opposite side of the insulator plate relative to the structural endplate. A pocket plate is located on an interior side of the collector plate located on an opposite side of the insulator plate relative to the structural endplate. The collector plate is received in a pocket of an exterior side of the pocket plate. The exterior side is adjacent the collector plate and closer to the structural endplate than an opposite side of the pocket plate.

The present invention provides, in a second aspect, a method for use in manufacturing a fuel cell which includes providing a structural endplate having an exterior surface. An interior surface of the structural endplate contacts an insulator plate located at an opposite surface of the endplate relative to the exterior surface. A pocket is formed in pocket plate and a collector plate is received in the pocket. The insulator plate contacts an exterior surface-of the pocket plate. An interior side of the collector plate contacts a bottom surface of the pocket.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
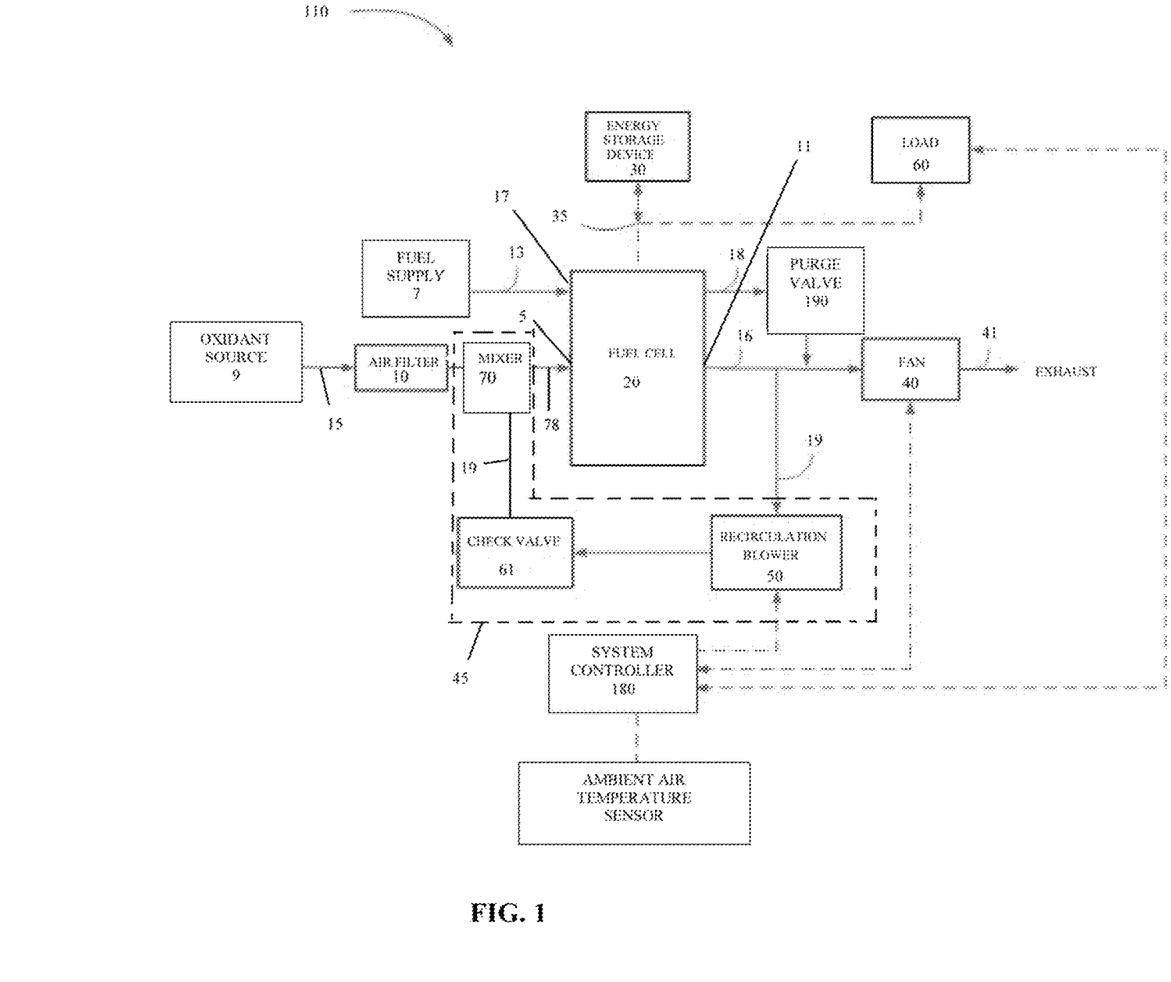
FIG. 1 is a block diagram of a fuel cell system in accordance with the invention.

In an example depicted in FIG. 1, a fuel cell system 10 is referred to as the assembled, or complete, system which functionally together with all parts thereof produces electricity and typically includes a fuel cell stack 20 and an energy storage device (30). The fuel cell is supplied with a fuel 13, for example, hydrogen, through a fuel inlet 17. Excess fuel 18 is exhausted from the fuel cell through a purge valve 190 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
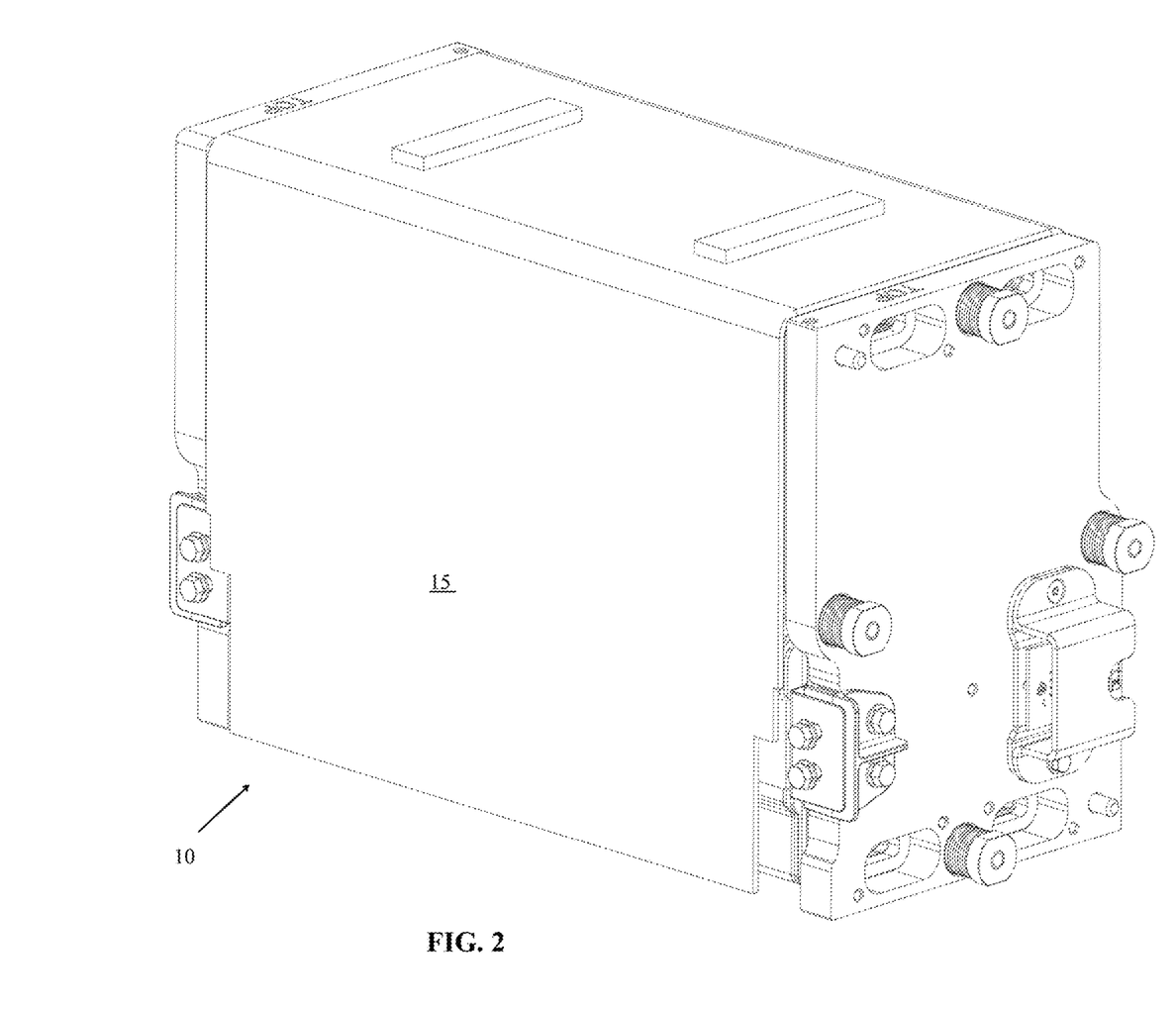
FIG. 2 is perspective view of the fuel cell stack of FIG. 1.
Figure 3:
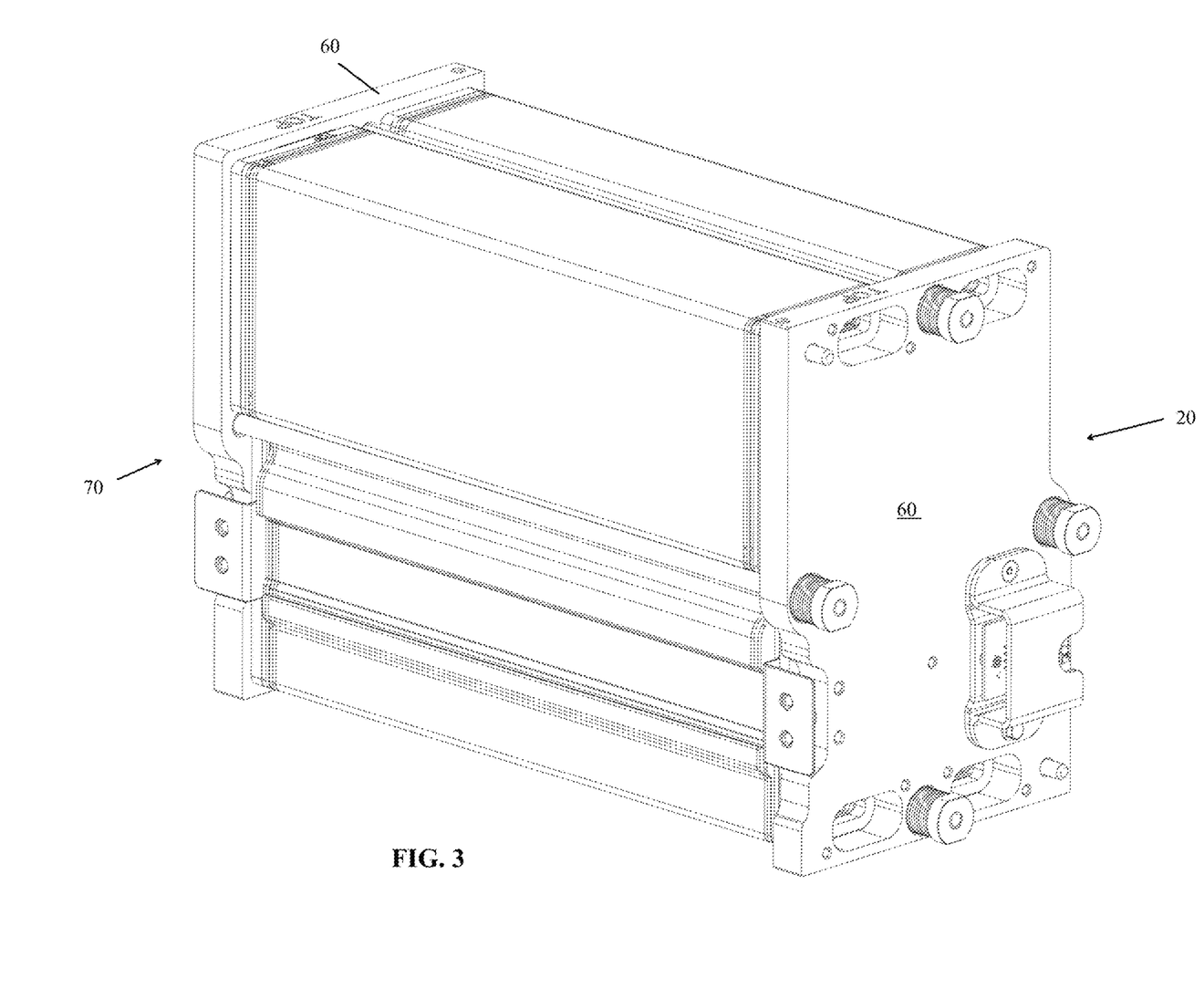
FIG. 3 is a perspective view of the fuel cell stack of FIG. 1 with a cover removed.
Figure 4:
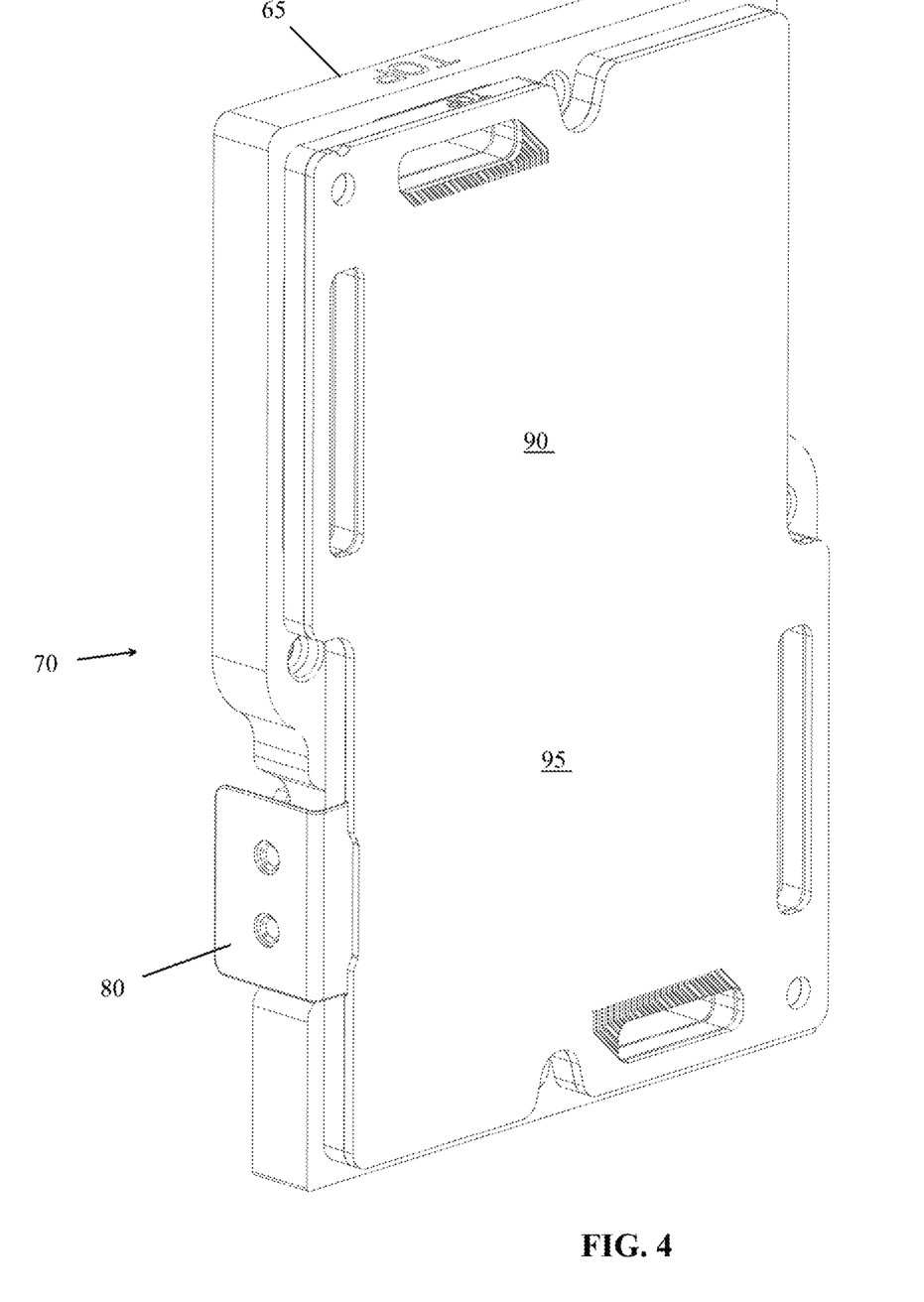
FIG. 4 is a perspective view of a sub-assembly of an end portion of the fuel cell stack of FIG. 1 showing a pocket plate as an interior surface of the sub-assembly.
Figure 5:
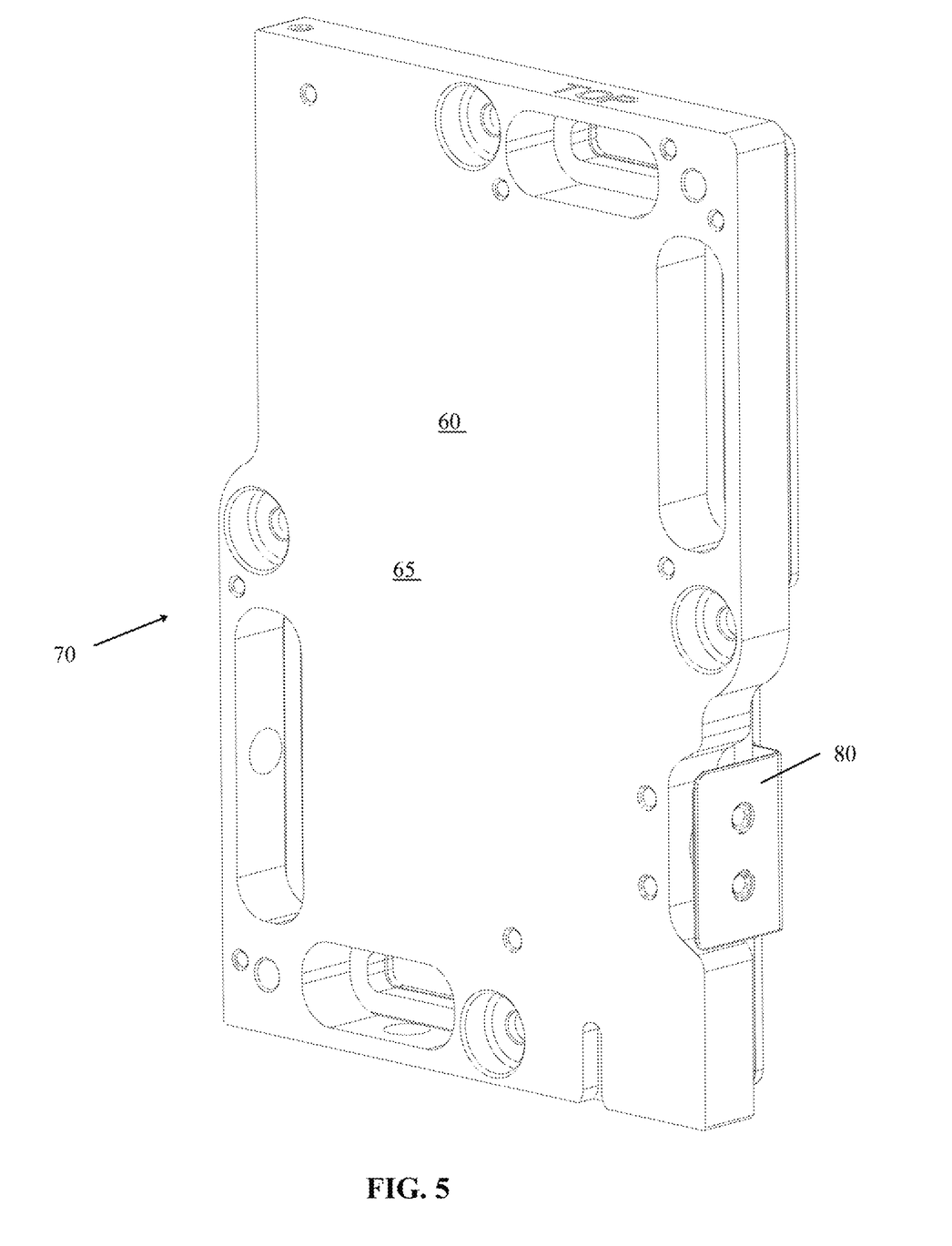
FIG. 5 is a perspective view of the sub-assembly of FIG. 4 showing an exterior surface thereof.
Figure 6:
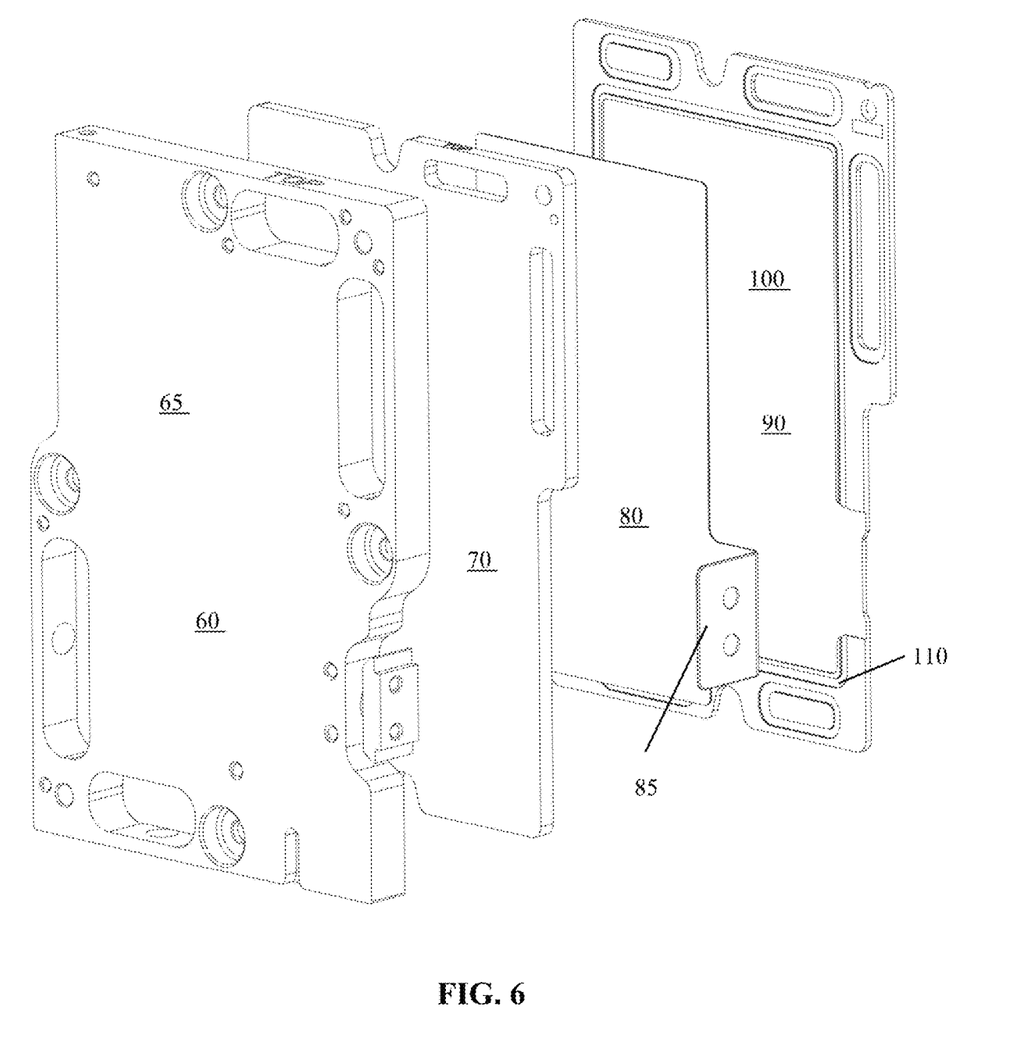
FIG. 6 is an exploded perspective of the sub-assembly of FIG. 4.

FIG. 2 depicts fuel cell stack 20 of FIG. 1 with a cover 15 removed. Structural end plates 60 are located at opposite ends of stack 20. An end 70 of stack 20 may include a first end plate 65 of structural end plates 60, an insulator plate 70, a collector plate 80 and a pocket plate (or separator plate) 90 as depicted in FIGS. 4-6. A gasket (not shown) and membrane electrode assembly may be located adjacent an interior side 95 of pocket plate 90. Fuel cell system 10 may include multiple instances of the membrane electrode assembly separated from each other (e.g., via Bipolar Plates (BPP)) and configured such that the last cells in the stack are electrically connected to collector plates (e.g., collector plate 80) at opposite ends of fuel cell stack 20. The voltage and electrical current are generated by oxidant and fuel being supplied to fuel cell 10 and the membrane electrode assembly.

Insulator plate may be formed of a thermoplastic or other material (e.g., glass, ceramic, thermoset) that would electrically insulate collector 80 from end plate 60. The material forming the insulator plate may be both a good thermal insulator and an electrical isolator. Collector plate 80 may be formed of copper or another conductive material, such as gold, silver, or aluminum. Pocket plate 90 may formed of graphite or another electrically conductive material, which is a very stable material and does not distort when machined, and may be easily machined to high accuracy. Pocket plate 90 may include a cavity or pocket 100 to receive collector plate 80 as depicted in FIGS. 6-7.

A depth 105 of pocket 100 in pocket plate 90 may be formed (e.g., machined using very precisely and easily repeated from part to part when pocket plate 90 is formed) from graphite, as indicated above. In contrast, it is more difficult and imprecise to form a pocket or cavity in a thermoplastic insulator plate (e.g., insulator plate 70) as in the prior art where such machining could lead to warping of the plastic material when machined or molded. Further, collector plate 80 must extend a required distance 112 out of pocket 100 in a direction toward insulator plate 70 as depicted in FIG. 7. The projection of collector plate 80 ensures that good contact pressure is maintained all over the collector plate to reduce contact resistance between the collector plate and the graphite pocket plate. Collector plate may also include an extension 85 extending outside the pocket in a direction parallel to a plane of collector 80 (i.e., perpendicular to the direction toward insulator plate 70) to connect collector plate 80 to system electrical connectors (e.g., cables, wires) so that power may be extracted from the fuel cell stack, or for monitoring stack performance.

Collector plate 80 may be received in pocket 100 such that an inner side 82 of collector plate 80 directly contacts a pocket bottom surface 102 of pocket plate 90. For example, an entirety of inner side 82 may abut bottom surface 102. In contrast, in the prior art it was often necessary to place shims beneath a collector plate in the situation where the collector plate was located in a cavity of an insulator plate in order to maintain a required height of the collector in the pocket while the precise nature of pocket 100 allows collector plate 80 to abut pocket bottom surface 102 for the entirety of inner side 82 to maintain an outer surface 81 of collector plate 80 at a desired position. The contact of collector plate 80 over all of inner side 82 with bottom surface 102 provides even contact pressure (and therefore conductivity) over the collector plate. Such even contact pressure reduces or limits in-plane resistance losses in the collector plate, the pocket plate, and the stack cell plates. In another example, a small grid pattern of ribs extending from bottom surface 102 contact inner side 82 (or vice versa) could provide such even contact pressure with only slightly increased resistance losses compared to such a bottom surface without such ribs.

Figure 7:
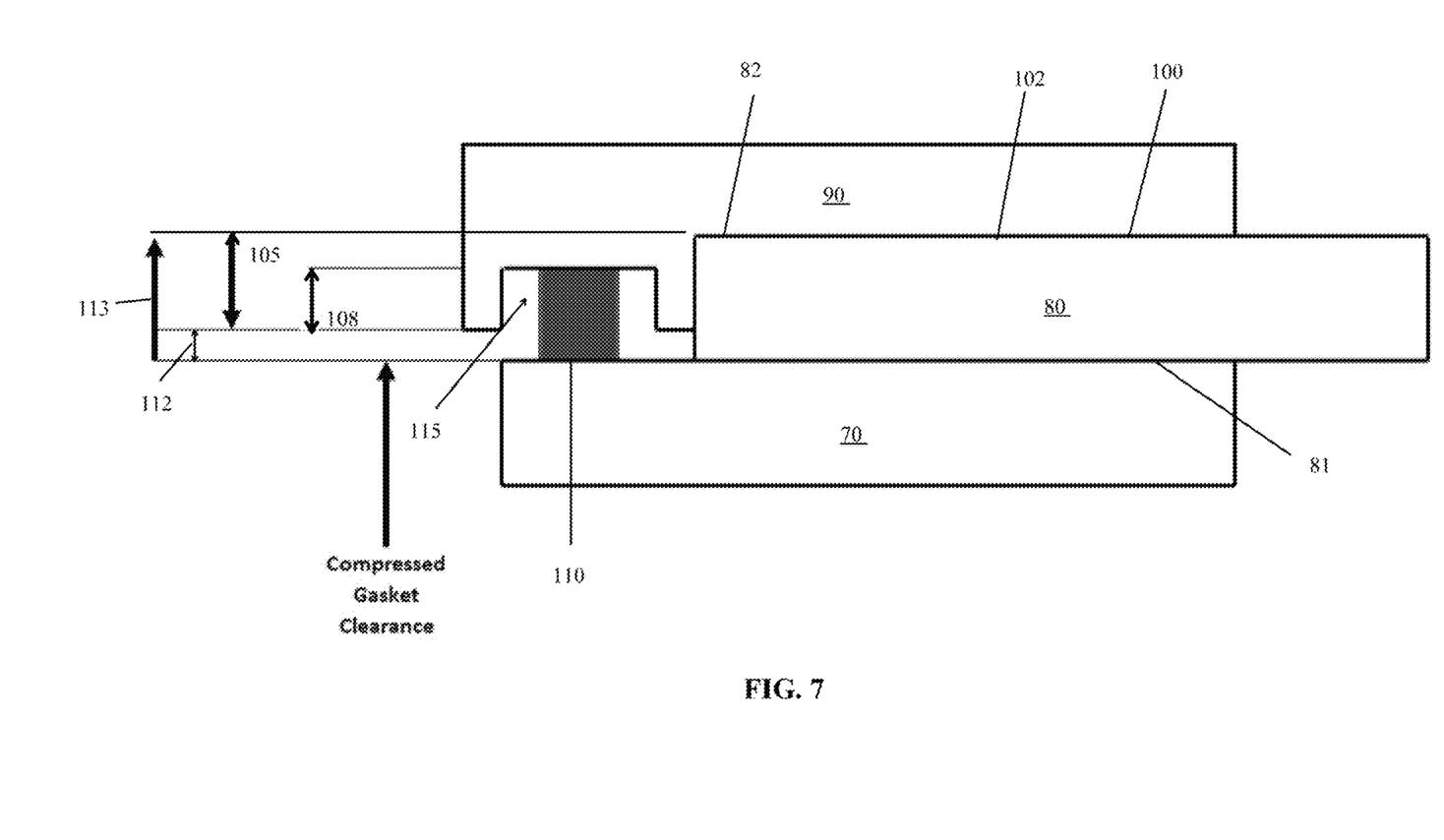
FIG. 7 is a block diagram view of a portion of the sub-assembly of FIG. 4.

As depicted in FIG. 7, which is a simplified side cross sectional view of pocket plate 90, collector plate 80 and insulator plate 70, a gasket 110 may be received in a gasket receiving pocket or channel 115 of pocket plate 90 with channel 115 having a depth 108. Gasket 110 may extend around a perimeter of collector plate 80, except for in an area of extension 85 extending outside pocket 100, such that oxidants and fuel, or other contaminants, may be sealed away from the collector plate. The gaskets serve to keep reactants and coolant contained within their respective areas while avoiding leaks outside such area. As depicted in FIG. 7 and indicated in the chart in FIG. 8, gasket 110 may be received in gasket receiving channel 115 and compressed upon assembly of stack 10 such that a compressed gasket clearance-a distance that the gasket extends out of receiving channel 115—is 89 percent of a height of collector plate 80 in a parallel direction A slightly protruding collector plate (e.g., as described relative to collector plate 80 and gasket 110) provides reliable electrical contact between a collector plate and pocket plate. An increased protrusion of the collector plate, could result in damage to the stack cell plates, membranes, or cell gaskets could leak, as described below.

Collector plate 80 may be received in pocket 100 to assure a full active area contact between the collector plate and the adjacent graphite plate, while maintaining proper gasket loading as described above between insulator plate 70 and pocket plate 90 (which may be a graphite separator plate as indicated above).

The gasket loading, i.e., loading of gasket 110 to provide the gasket clearance described above, between the insulator plate (i.e., insulator plate 70) and a first graphite plate (i.e., pocket plate 70) is important for two reasons. The load must be adequate to seal around ports and at the same time not be excessive in order to prevent cracking of the graphite plate (i.e., pocket plate 70). Typically the gasket compression must be at least 10% at the minimum tolerance gasket height and not more that 40% at the maximum tolerance gasket height. As indicated, in a prior art instance, a collector plate received in a pocket of an insulator plate, the combined tolerance ranges of the collector plate thickness and the insulator pocket depth required that a shim pack be used under the collector plate in order to achieve the proper gasket compression. Such shims are not necessary in the present invention due to the precision machining of pocket plate 90 using a material that is inherently stable and stress free, such as graphite, such that collector plate 80 may be received in pocket 100 to provide a full active area contact between collector plate 80 and bottom surface 102 of pocket 100 of pocket plate 90. As described above, such full active area contact may provide lower contact resistance, less in-plane resistance, more efficiency, and less energy lost to heat.

Figure 8:
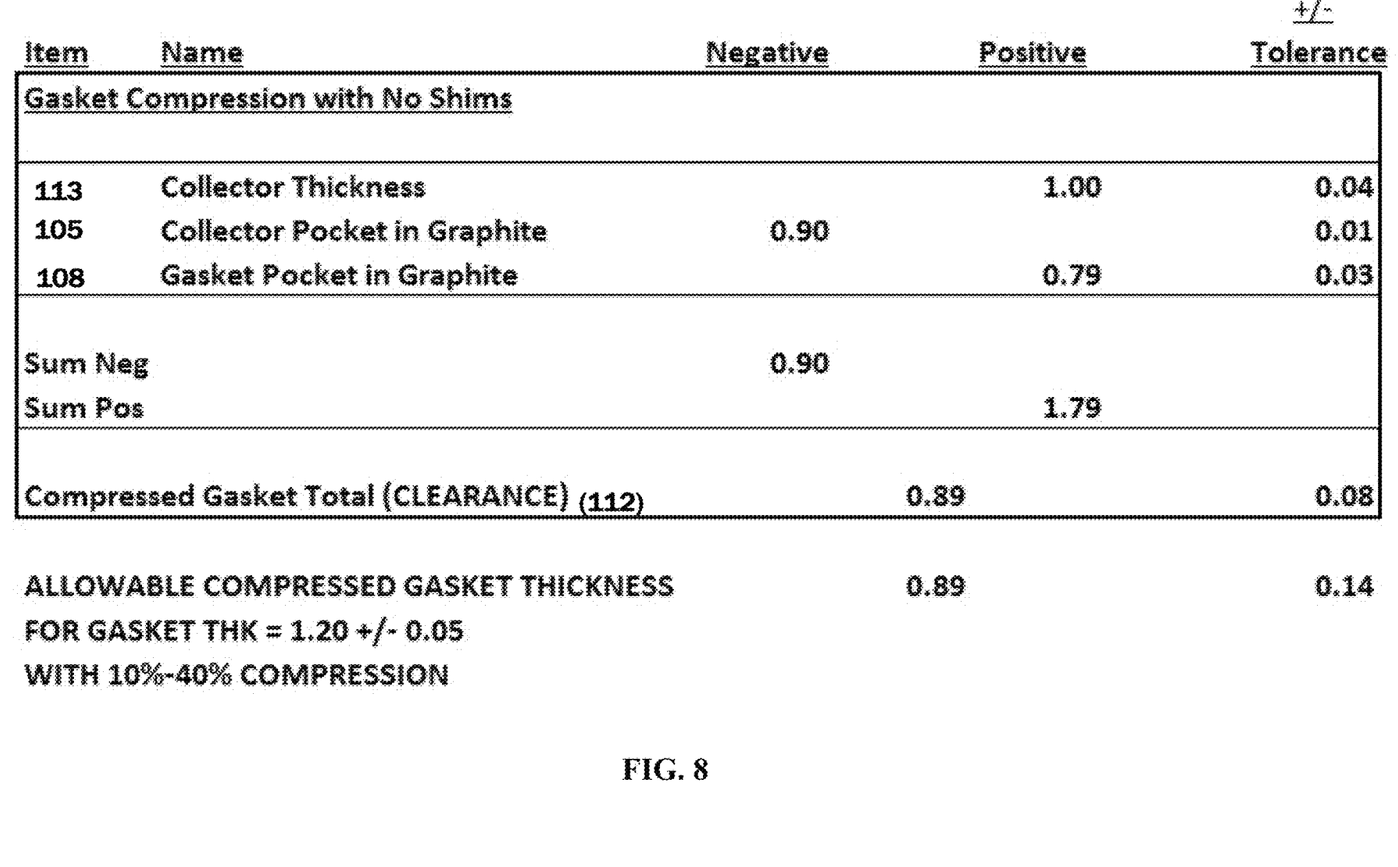
FIG. 8 is a table showing the details of the sub-assembly of FIG. 7.

In the example indicated in FIG. 8, collector plate 80 is a 1.0 mm copper collector plate (i.e., a thickness 113) having a thickness tolerance of +/−0.04 mm. Pocket 100 has a depth or thickness 105 of 0.9 mm with a tolerance of 0.01 mm. Gasket receiving pocket 115 has a depth 108 of 0.79 mm with a tolerance of 0.03 mm. Gasket 110 is compressed at an amount of 10-40 percent as suggested above to a compressed gasket total 112. The indicated depths and tolerances formed in a graphite material (e.g., pocket plate 90) would not be possible in the prior art pocket formed in a thermoplastic insulator plate adjacent to a graphite separator plate due to the warping of the plastic material during machining (e.g., CNC machining) or molding. The small tolerances possible in a machined graphite plate allow a collector plate (e.g., collector plate 80) received in a pocket of a separator plate (e.g., pocket plate 90) to avoid the use of shims to support the collector plate in the pocket. Such shims used in an insulator plate make for imprecise assembly due to the combination of the uncertainty of the machining in the thermoplastic combined with the uncertainty of the size of shims to be used between the thermoplastic and the conductive material.

In contrast to the location of a pocket in an insulator plate to receive a collector in the prior art, pocket plate 90 having pocket 100 replaces a "cooler blank" plate in prior art devices which eliminates the problems associate with machining and shimming thermoplastic forming an insulator plate while allowing the position in the stack that would be relegated to a "cooler blank" plate to also perform the function of the pocket plate without adding an additional plate. A "cooler blank" plate on each end of a fuel cell stack does not usually have channels for reactants and thus the use of this plate also as a pocket plate allows it to provide a function beyond that of providing a structural end to the stack.

Returning to FIG. 1, an electrical demand by a load 60, for example, an industrial electric vehicle (e.g., an electrically powered forklift truck), or any other load, such as any electric device, light bulb, radio, electric heater, or fan motor, may be connected to the energy storage device 30 and fuel cell stack 20 in parallel by an electrical connection 35. Depending on the demand, power may flow from energy storage device 30, fuel cell 20 or both to the load. In times of high demand in excess of the maximum power output of the fuel cell 20, power may flow from both the fuel cell 20 and energy storage device 30 to load 60. In times of low demand, power may flow to load 60 from fuel cell 20, while excess power from the fuel cell 20 may flow into energy storage device 30 to recharge energy storage device 30 when required. In the case of loads that can source power, such as regenerative braking, power may flow from "load" 60 to energy storage device 30.

The controller (i.e., controller 180) described above, could be any type of computing unit (e.g., a personal computer operating a WINDOWS operating system or Apple OSX operating system, a Unix system, a microprocessor (which may or may not utilize a BIOS or operating system) or a mobile computing device such as a tablet computer or smart phone) configured to communicate with and/or control a fuel cell (fuel cell 20), temperature sensors located on portions of the fuel cell including the plates thereof, an energy storage device (e.g., energy storage device 30), a balance of a plant, a fuel supply (e.g., a source of oxidants or fuel), a fan (e.g., fan 40), a blower (e.g., blower 50) and/or a load (e.g., load 60). Further, the controller (e.g., controller 180) could be a unit separate from the sensors, fan, blower, fuel cell stack, energy storage device, and load device. Moreover, such a controller could be part of one or more of these components (e.g., the sensors, fan, blower, fuel cell, load device, and energy storage device) or could be distributed between these devices and other connected systems, such as the balance of plant while the distributed portions of such controller could be coupled to each other to allow communication therebetween.

The load (e.g., load 60) described above could be any type of stationary or moveable load device, such as an industrial electrical vehicle or forklift truck. The fuel cell (e.g., fuel cell stack 20) could be any type of fuel cell such as a proton exchange membrane fuel cell, solid oxide fuel cell, or any other fuel cell as would be known by one of ordinary skill in the art. The energy storage device (e.g., energy storage device 30) described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference will now be made to embodiments of the invention and specific language will be used to describe the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated an protected.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fuel cell system comprising:
  a structural endplate having an exterior surface;
  an insulator plate contacting an interior surface of said structural endplate located on an opposite surface of said endplate relative to said exterior surface;
  a collector plate contacting said insulator plate on an opposite side of said insulator plate relative to said structural endplate;
  a conductive pocket plate located on an interior side of said collector plate located on an opposite side of said insulator plate relative to said structural endplate;

said collector plate received in a pocket of an exterior side of said pocket plate, said exterior side being adjacent said collector plate and being closer to said structural endplate than an opposite side of said pocket plate;

said collector plate comprising an inner side on an opposite side of said collector plate relative to said insulator plate, and an entirety of said inner side directly contacting a pocket bottom surface of said pocket plate to provide an even contact pressure and conductivity over said collector plate.

2. The fuel cell system of claim 1 further comprising a gasket received in a gasket pocket of said pocket plate, said gasket extending around a perimeter of said collector plate except for an opening, wherein an extending portion of said collector plate extends through said opening to provide an electrical connection with another portion of the system.

3. The fuel cell system of claim 1, wherein said pocket plate consists of graphite.

4. The fuel cell system of claim 1 wherein said collector plate extends out of said pocket toward said insulator plate a separation distance separating an outer surface of said pocket plate from an inner surface of said insulator plate.

5. The fuel cell system of claim 4 further comprising a gasket received in a gasket pocket of said pocket plate, said gasket extending past an outer surface of said pocket plate a gasket clearance distance equal to said separation distance.

6. The fuel cell system of claim 5 wherein said gasket is compressed 10 to 40 percent relative to an uncompressed state.

7. The fuel cell system of claim 1 wherein said insulator plate consists of thermoplastic.

8. A method for use in manufacturing a fuel cell comprises:

providing a structural endplate having an exterior surface;

contacting an interior surface of the structural endplate with an insulator plate located on an opposite surface of the endplate relative to the exterior surface;

forming a pocket in a conductive pocket plate and receiving a collector plate in the pocket, the collector plate comprising an inner side on an opposite side of the collector plate relative to said insulator plate;

an entirety of the inner side of the collector plate directly contacting a pocket bottom surface of the pocket plate to provide an even contact pressure and conductivity over the collector plate; and contacting the insulator plate with an exterior surface of the pocket plate.

9. The method of claim 8 wherein the pocket plate consists of graphite and the forming the pocket comprises machining the pocket out of a remainder of the pocket plate.

10. The method of claim 8 further comprising compressing a gasket in a gasket receiving pocket of the pocket plate 10 to 40 percent relative to a height of the gasket prior to a compression.

11. The method of claim 8 wherein the forming the pocket comprises forming the pocket such that the collector plate extends out of the pocket toward the insulator plate a separation distance separating an outer surface of the pocket plate from an inner surface of the insulator plate.

12. The method of claim 11 further comprising receiving a gasket in a gasket pocket of the pocket plate, the gasket extending past an outer surface of the pocket plate a gasket clearance distance equal to the separation distance.

* * * * *